United States Patent Office 3,383,354
Patented May 14, 1968

3,383,354
STABILIZED POLYOLEFINS AND PROCESS
FOR MAKING THEM
Eberhard Prinz, Frankfurt am Main, Felix Schülde, Neuenhain, Taunus, and Otto Mauz and Dietrich Schleede, Frankfurt am Main, Germany, assignors to Hercules Incorporated, a corporation of Delaware
No Drawing. Filed Sept. 22, 1965, Ser. No. 489,384
Claims priority, application Germany, Sept. 23, 1964,
F 44,040
6 Claims. (Cl. 260—45.85)

ABSTRACT OF THE DISCLOSURE

Polyolefins, such as polyethylene and polypropylene, are stabilized by the addition of small amounts of a specified benzophenone or salicylate; an amide of phosphoric or polyphosphoric acid; and a phenolic anti-oxidant.

---

The present invention relates to stabilized polyolefins and a process for making them.

Many high-polymeric compounds, especially thermoplastic materials such as polyolefins, suffer degradation by the action of oxygen at elevated temperatures and/or by the action of light. The macromolecules are split, whereby the technological properties, for example, strength, elongation and toughness of the products are impaired. Various stabilizers have been suggested to avoid or largely delay such degradation.

It is known, for example, that many phenolic compounds as well as thioethers represent effective anti-oxidants for polyolefins. For light-stabilizing ultra-violet absorbers such, for example, as benzophenones, benzotriazoles or derivatives of salicylic acid may be used in known manner. However, to obtain fairly sufficient light stability the said ultra-violet absorbers must generally be added in relatively large proportions.

It is known to one skilled in the art that the finished products made of polymers, for example, of polyolefins, possess particularly high service value when the polymer material is simultaneously stabilized against the high processing temperatures, against the action of oxygen at the changing temperatures which the material is exposed to when used, as well as against the action of light.

By using one type of stabilizer only, simultaneous effective protection against all three types of deterioration mentioned has not been hitherto attained in polyolefins. The known combinations of stabilizers do not generally lead to the desired result either, since those stabilizing systems are in most cases effective against only one of the above types of deterioration. Thus it is known, for example, that the synergistic mixtures of phenols, particularly bisphenols and thioethers, which are highly effective against the action of atmospheric oxygen at elevated temperatures are only very little effective against the action of light. As far as light-stabilization is concerned these stabilizer mixtures have no synergistic effect.

Moreover, combinations of stabilizers are known by which, for example, the oxidation stability, i.e., resistance towards heat-ageing, of polyolefins is increased, whereas their thermostability or stability on processing is considerably reduced, and vice versa.

It is generally possible that with respect to their effectiveness different types of stabilizers influence each other in a positive or in a negative way or not at all, when being used in admixture with one another; their effectiveness may sum up or even rise to a higher power like in the case of the synergistic systems, but they also may have detrimental effect on one another.

For the above reasons the actions of combinations of stabilizers cannot be foreseen in many cases, even if the action of the individual component is known.

Now we have found that polyolefins can be stabilized against the action of light by adding to them as stabilizer 0.1 to 5% by weight, preferably 0.5 to 2% by weight, calculated on the polyolefin, of a mixture of three components—(a), (b) and (c)—which are:

(a) A compound of the general formula

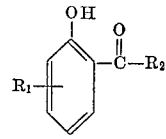

in which $R_1$ represents H, OH, an alkyl radical containing 1 to 18 preferably 1 to 12 carbon atoms, or an alkoxy radical containing 1 to 18, preferably 1 to 14 carbon atoms and $R_2$ represents an alkyl radical containing 1 to 20, preferably 1 to 4 carbon atoms, an alkoxy radical containing 1 to 4 carbon atoms or a phenyl radical which may be substituted by OH-groups, alkyl groups containing 1 to 18 carbon atoms or by alkoxy groups containing 1 to 18 carbon atoms.

(b) An organic amide of phosphoric acid or of a polyphosphoric acid in which the OH-groups have been wholly or partially replaced by amino groups which may be unsubstituted or mono- or disubstituted by alkyl groups containing 1 to 18 carbon atoms, and in which at least one of the amino groups must be substituted by at least one alkyl radical, and (c) A condensation product of alkylphenols with aldehydes, ketones or sulfur chlorides.

It is known from British Patent No. 941,575 that mixtures of organic phosphorus amides with condensation products of alkyl phenols with aldehydes, ketones or sulfur chlorides have a good oxidation-stabilizing effect at elevated temperatures. However, it could not be foreseen that such stabilizing systems having a good stabilizing effect against heat-ageing show—in combination with derivatives of benzophenone or salicylic acid—such an exceeding synergistic effect as light stabilizers as has been found according to the present invention.

Belgian patent specification No. 620,608 describes mixtures of stabilizers consisting of ultra-violet absorbers which may be derivatives of benzophenone and of salicylic acid, of sulfur-containing organic phosphorus compounds and possibly of phenolic anti-oxidants. The results given in the test tables of the patent specification mentioned, however, show that the actions of the stabilizer components approximately sum up, i.e., the effectiveness of the mixtures is nearly equal to the sum of the actions of the individual components. In some cases the effectiveness of the mixture is remarkably lower, but it has never been higher than the sum of the individual actions. In contradistinction to the mixtures according to the invention one cannot say that the mixtures of stabilizers described in the Belgian patent specification mentioned have synergistic effect.

As polyolefins to be stabilized by the process of the invention high-pressure polyethylene and advantageously high-molecular homo- and copolymers of ethylene and/or α-olefins obtained by the know low pressure polymerization processes may be used. Polyethylene, polypropylene, polybutene-1 and copolymers of ethylene, propylene and/or butene-1 obtained with the use of Ziegler catalysts (cf. Raff-Allison "Polyethylene," pp. 72 to 81) can be stabilized by the process of the invention with particular advantage. Especially the stabilization of polypropylene according to the invention yields products with such an excellent stability to light as could not hitherto be obtained even by adding a considerably larger amount of stabilizer than that used in the process of the invention.

As component (a) in the mixtures of stabilizers according to the invention there are preferably used derivatives of benzophenone or acetophenone, containing at least one OH-group in o-position to the carbonyl group, for example, 2 - hydroxy - 4 - methoxy - benzophenone, 2 - hydroxy-4-methoxy-acetophenone, 2-hydroxy - 4 - octoxy-benzophenone, 2-hydroxy - 4 - octoxy-acetophenone, 2-hydroxy - 4-dodecyloxy-acetophenone, 2-hydroxy-4-dodecyloxy-benzophenone or 2,2'-dihydroxy - 4 - octoxy - benzophenone. Derivatives of salicylic acid such, for example, as p-octyl-phenyl salicylate, p-octoxyphenyl salicylate, p-tert, butyl-phenyl salicylate or the butylester of 2-hydroxy-5-methylbenzoic acid are appropriate, too.

As organic phosphorus amides (component (b)) in the stabilizer combinations according to the invention there may be used, for example, the following: Phosphoric acid-N-methylamide-diamide, phosphoric acid-N,N-dimethylamide-diamide, phosphoric acid-N,N-diesterylamide - diamide, phosphoric acid - tri - (N,N - dimethylamide), phosphoric acid-tri-(N-dodecylamide), diphosphoric acid - di - (N - methyl - N - stearylamide) and condensation products obtained, for example from 2 molecules of phosphoric acid-N-methyl-N-stearylamide-diamide by the splitting off of $NH_3$. When using phosphorus amides containing free $NH_2$-groups such condensation with the splitting off of $NH_3$ may also take place after addition of the phosphorus amides to the poly-olefins at the high processing temperatures without the stabilizing effect of the phosphorus compound getting lost.

As component (b) in the mixtures according to the invention phosphoric acid-N-methyl-N-stearylamide-diamide and di-(phosphoric acid-amide-N-tert.butyl-N-dodecylamide)-imide are preferably used.

The phosphorus amides used can be obtained, for example, by condensing $POCl_3$ or $P_2O_5$ with alkyl-substituted amines in the pressence or absence of ammonia. When condensing, for example, 1 mole of $P_2O_5$ with 2 moles of N-methyl-N-stearylamine, diphosphoric acid-di-(N-methyl-N-stearylamide) is obtained in good yield, and when condensing 1 mole of $POCl_3$ with 1 mole of N-methyl-N-stearylamine and 2 moles of $NH_3$ one obtains phosphoric acid-N-methyl-N-stearylamide-diamide which is condensed on heating and with the splitting off of $NH_3$ to di-(phosphoric acid-N-methyl-N-stearylamide-amide)-imide.

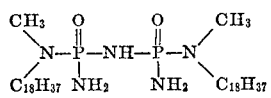

As stabilizing components (c) in the mixtures according to the invention 4,4'-thio-bis-(3-methyl-6-tert.butylphenol) and the condensation product of acetone and p-nonylphenol, or the condensation product of crotonaldehyde with 3-methyl-6-tert.butyl-phenol as well as the condensation product of acetoacetic acid dodecylester with ortho-cresol are particularly appropriate.

The stabilizing components may be used in any desired ratio in a total concentration of 0.1 to 5% by weight, preferably 0.5 to 2% by weight, calculated on the polyolefin. However, to obtain an optimum synergistic effect it is in most cases advisable to use the components (a), (b) and (c) in a ratio of 5:1:1 to 1:5:1, preferably 3:1:1 to 1:3:1.

Of course, other conventional additives, for example, pigments, dyestuffs, fillers or lubricants may also be added to the polyolefins stabilized according to the invention. Moreover, those known stabilizers may additionally be used by which the resistance towards heat-ageing or the colour of the polyolefins can be improved.

The stabilizing components may be mixed with the polyolefins all at the same time or successively, most favourably using a mixture containing a large proportion of stabilizer and a small proportion of polyolefin. For this purpose a concentrated solution of the stabilizing compounds in a low-boiling solvent, for example, acetone or methylene chloride is mixed with a small amount of the pulverulent polymerization product to be stabilized, the proportion being such that after evaporation of the solvent the mixture contains about 30 to 40% by weight of stabilizing agent.

By proceeding in this manner a dry powder is obtained which can be introduced in the usual manner into the polymer to be stabilized, in order to obtain the desired concentration of stabilizing agent in the finished mass. The stabilizers may also be introduced during the manufacture of the polymers or during their working up. The particular advantage of this mode of operation is that very early, i.e., during the process of manufacture or working up, the polymer is protected against the action of light and atmospheric oxygen, particularly at elevated temperatures. The polyolefins stabilized in this manner can be processed according to the known moulding methods, i.e., by compression moulding, injection moulding and extrusion moulding.

The following examples serve to illustrate the invention, but they are not intended to limit it thereto.

EXAMPLE 1

400 g., of a polypropylene powder having a reduced specific viscosity $\eta_{red.}$ of 3.61 dl./g. (determined in a 0.1% solution in decahydronaphthalene at 135° C.), a melt index $i_5$ of 7.0 g./10 minutes (determined at 230° C. according to ASTM 1238–57T with a 5 kg. charge) and a density of 0.906 g./cm.$^3$ were mixed with 5% solutions of the stabilizers given in Table 1 hereinafter in such proportion that the concentration of the stabilizer calculated on the polypropylene, was 5 times the amount of the concentration given in Table 1. After drying at 80° C. under vacuum the stabilized polypropylene powder was intensely mixed with 1,600 g. of unstabilized polypropylene powder, and the mixture was then granulated in a laboratory extruder at 200° C.

The test granulate was extruded at a temperature of from 150 to 260° C. to a filament by an extruder of the Kleinewefers type provided with a turner head and a spinning nozzle. After having been passed through a quenching bath maintained at 50°, the filament was continuously drawn in a ratio of 1:6 in a drawing bath that was maintained at a temperature of 95° C.

The monofilaments obtained in this manner, having a diameter of 0.62 to 0.65 mm. were wound up on stainless steel test frames of 200 x 50 x 1 mm. with the use of two fixed spacing strips and with constant pretension in a manner such that the windings of the filaments exposed to weathering were kept in a distance of 3 mm. from the supporting plate. In Florida the frames on which the monofilaments to be tested had been wound up were placed in an inclination of 45° towards the south and left to the influence of the weather. After the weathering periods given in Table 1, 10 filaments of each formulation were tested with respect to their tensile strength and elongation at break.

The values given in Table 1 are mean values from 10 individual measurings and are, therefore, representative of the weathering of the individual monofilaments.

EXAMPLE 2

Instead of the polypropylene powder used in Example 1, a copolymer of ethylene and butene-1 was used which had been prepared in the presence of a Ziegler catalyst using 1.5% by weight of butene-1. The copolymer had a reduced specific viscosity of $\eta_{red.}$ 2.5 dl./g. (determined in a 0.1% solution in decahydronaphthalene at 135° C.), a melt index $i_5$ of 1.7 g./10 minutes (determined at 190° C. according to ASTM 1238–57T with a 5 kg. charge) and a density of 0.942 g./cm.$^3$.

The same procedure was applied as in Example 1 except the following modifications:

Extruder temperature for granulation 180° C., temperature in the Kleinewefers spinning extruder 130 to 250° C., drawing ratio 1:8.

Weathering and testing of the monofilaments were carried out under the same conditions as given in Example 1.

in which $R_1$ represents H, OH, an alkyl radical containing 1 to 18 carbon atoms or an alkoxy radical containing 1 to 18 carbon atoms, and $R_2$ represents an alkyl radical containing 1 to 20 carbon atoms, an alkoxy radical con- TABLE I.—LIFE OF POLYPROPYLENE MONOFILAMENTS WEATHERED IN FLORIDA (SEE EXAMPLE 1)

| | Stabilizer components [1] | Concentration (percent) [2] | Weathering period | | | | | | | |
|---|---|---|---|---|---|---|---|---|---|---|
| | | | 1 month | | 3 months | | 5 months | | 9 months | |
| | | | Amount of light irradiated (Langley units) | | | | | | | |
| | | | 15.3×10³ | | 40.6×10³ | | 63.1×10³ | | 116×10³ | |
| | | | Elongation at break (percent) [4] | Tensile strength (kp./cm.²) [5] | Elongation at break (percent) [4] | Tensile strength (kp./cm.²) [5] | Elongation at break (percent) [4] | Tensile strength (kp./cm.²) [5] | Elongation at break (percent) [4] | Tensile strength (kp./cm.²) [5] |
| Comparison test: | | | | | | | | | | |
| 1 | C | 0.5 | 13.4 | 2,830 | (³) | (³) | | | | |
| 2 | A / C | 0.5 / 0.5 | 30.0 | 4,050 | 14.2 | 2,620 | 3.6 | 766 | (³) | (³) |
| 3 | A / C | 1.0 / 0.5 | 37.5 | 4,100 | 20.0 | 3,060 | 15.0 | 2,600 | (³) | (³) |
| 4 | B / B | 0.5 / 0.5 | 29.0 | 3,820 | 13.8 | 2,340 | 7.4 | 1,170 | (³) | (³) |
| 5 | B / C | 1.0 / 0.5 | 29.8 | 3,590 | 14.8 | 2,430 | 3.4 | 465 | (³) | (³) |
| Invention test: | | | | | | | | | | |
| 6 | A / B / C | 0.25 / 0.5 / 0.5 | 30.4 | 3,650 | 26.6 | 3,530 | 22.0 | 3,297 | 15.2 | 2,048 |
| 7 | A / B / C | 0.25 / 1.0 / 0.5 | 32.6 | 3,853 | 28.8 | 2,812 | 23.6 | 3,491 | 13.2 | 2,086 |
| 8 | A / B / C | 0.5 / 0.5 / 0.5 | 37.0 | 3,824 | 35.4 | 4,100 | 34.2 | 4,004 | 25.2 | 3,412 |

[1] Stabilizer components:
A=2-hydroxy-4-octoxy-benzophenone.
B=phosphoric acid-N-methyl-N-stearyl-amide-diamide.
C=2,2'-isopropylidene-bis-(p-nonyl phenol).
[2] Percent by weight, calculated on polypropylene.
[3] Test specimens completely embrittled.
[4,5] Clamping length 10 cm., cross-head speed 200 mm./min.

TABLE 2.—LIFE OF MONOFILAMENTS OF ETHYLENE/BUTENE-1 COPOLYMERS, WEATHERED IN FLORIDA (SEE EXAMPLE 2)

| | Stabilizer components [1] | Concentration (percent) [2] | Weathering period | | | | | |
|---|---|---|---|---|---|---|---|---|
| | | | 1 month | | 5 months | | 9 months | |
| | | | Amount of light irradiated (Langley units) | | | | | |
| | | | 15.3×10³ | | 61.1×10³ | | 116×10³ | |
| | | | Elongation at break (percent) [4] | Tensile strength (kp./cm.²) [5] | Elongation at break (percent) [4] | Tensile strength (kp./cm.²) [5] | Elongation at break (percent) [4] | Tensile strength (kp./cm.²) [5] |
| Comparison test: | | | | | | | | |
| 1 | D | 0.05 | 38.0 | 3,950 | 16.2 | 2,680 | (³) | (³) |
| 2 | A / D | 0.5 / 0.05 | 50.8 | 3,980 | 47.8 | 4,140 | 14.2 | 2,140 |
| 3 | A / D | 1.0 / 0.05 | 51.4 | 3,850 | 49.4 | 4,240 | 23.4 | 3,410 |
| 4 | C / D | 0.5 / 0.05 | 34.0 | 3,450 | 39.3 | 2,580 | 10.9 | 1,965 |
| 5 | C / D | 1.0 / 0.05 | 36.8 | 3,592 | 21.6 | 2,750 | 14.4 | 2,285 |
| Invention test: | | | | | | | | |
| 7 | A / B / C | 0.5 / 0.5 / 0.05 | 50.5 | 3,790 | 49.1 | 4,250 | 49.6 | 4,190 |
| 8 | B / C / D | 0.5 / 0.5 / 0.05 | 48.7 | 3,670 | 43.3 | 4,100 | 47.0 | 4,085 |

[1] Stabilizer components:
A=2-hydroxy-4-octoxy-benzophenone.
B=p-octyl-phenyl salicylate.
C=di-(phosphoric acid-amide-N-tert.butyl-N-dodecyl-amide)-imide.
D=4,4'-thio-bis-(3-methyl-6-tert.butyl-phenol).
[2] Percent by weight, calculated on polymer.
[3] Test specimens completely embrittled.
[4,5] Clamping length 10 cm., cross-head speed 200 mm./min.

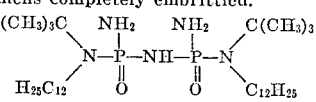

We claim:

1. Composition of matter consisting essentially of a polymer of a mono-olefin having from 2 to 4 carbon atoms and 0.1 to 5% by weight of a mixture of (a) a compound of the general formula

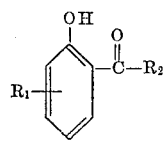

taining 1 to 4 carbon atoms or a phenyl radical which may be substituted by OH-groups, alkyl groups containing 1 to 18 carbon atoms or by alkoxy groups containing 1 to 18 carbon atoms, (b) an organic amide of phosphoric or polyphosphoric acid selected from the group consisting of phosphoric acid-N-methylamide-diamide, phosphoric acid-N,N-dimethylamide-diamide, phosphoric acid-N,N-distearylamide-diamide, phosphoric acid-tri-(N,N-dimethylamide), phosphoric acid-tri-(N-dodecylamide), diphosphoric acid-di-(N-methyl-N-stearylamide), and (c) a phenolic stabilizer selected from the group consisting of 4,4'-thiobis-(3-methyl-6-t-butylphenol) and 2,2'-isopropylidene-bis-(p-nonylphenol), the weight ratio of (a), (b) and (c) varying from 5:1:1 to 1:5:1.

2. The composition of claim 1 in which component (a) is 2-hydroxy-4-octoxy benzophenone.

3. The composition of claim 1 in which component (a) is p-octyl-phenyl salicylate.

4. The composition of claim 1 in which component (b) is phosphoric acid-N-methyl-N-stearlyamide-diamide.

5. The composition of claim 1 in which the polymer is polypropylene.

6. The composition of claim 1 in which component (c) is 4,4'-thiobis-(3-methyl-6-t-butylphenol).

References Cited

UNITED STATES PATENTS

| 2,662,061 | 12/1953 | Gilciease et al. | 260—45.95 |
| 2,670,382 | 2/1954 | Downey et al. | 260—45.95 |
| 3,020,259 | 2/1962 | Schulde et al. | 260—45.95 |
| 3,033,814 | 5/1962 | Tholstrup | 260—45.85 |
| 3,100,197 | 8/1963 | Heuck et al. | 260—45.95 |
| 3,297,478 | 1/1967 | Larsen | 260—45.95 |
| 3,301,816 | 1/1967 | Burgess | 260—45.95 |

DONALD E. CZAJA, *Primary Examiner.*

H. E. TAYLOR, Jr., *Examiner.*

UNITED STATES PATENT OFFICE
CERTIFICATE OF CORRECTION

Patent No. 3,383,354                      May 14, 1968

Eberhard Prinz et al.

It is certified that error appears in the above identified patent and that said Letters Patent are hereby corrected as shown below:

Columns 5 and 6, TABLE 1, second column, line 7 thereof, "B" should read -- C --; TABLE 2, fourth column, in the heading, "$61.1 \times 10^3$" should read -- $63.1 \times 10^3$ --.

Signed and sealed this 23rd day of September 1969.

(SEAL)
Attest:

Edward M. Fletcher, Jr.                WILLIAM E. SCHUYLER, JR.
Attesting Officer                          Commissioner of Patents